Patented July 8, 1941

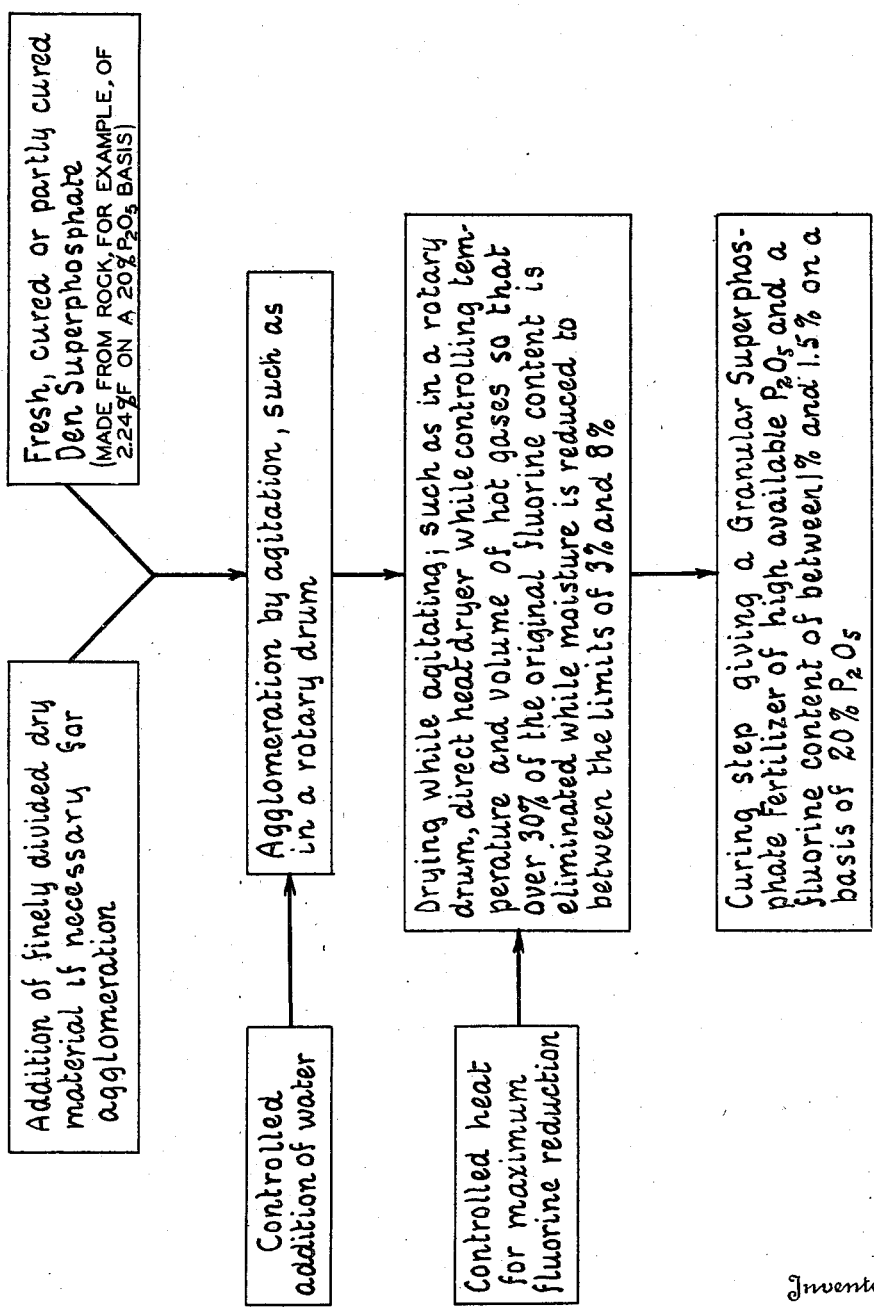

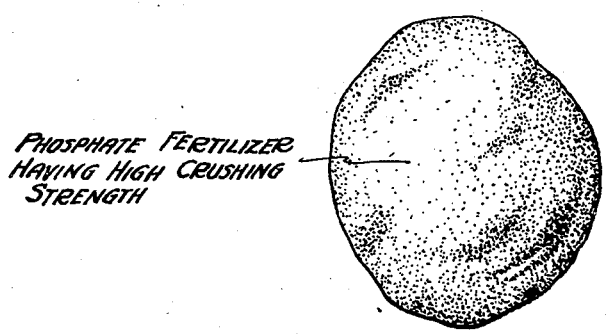
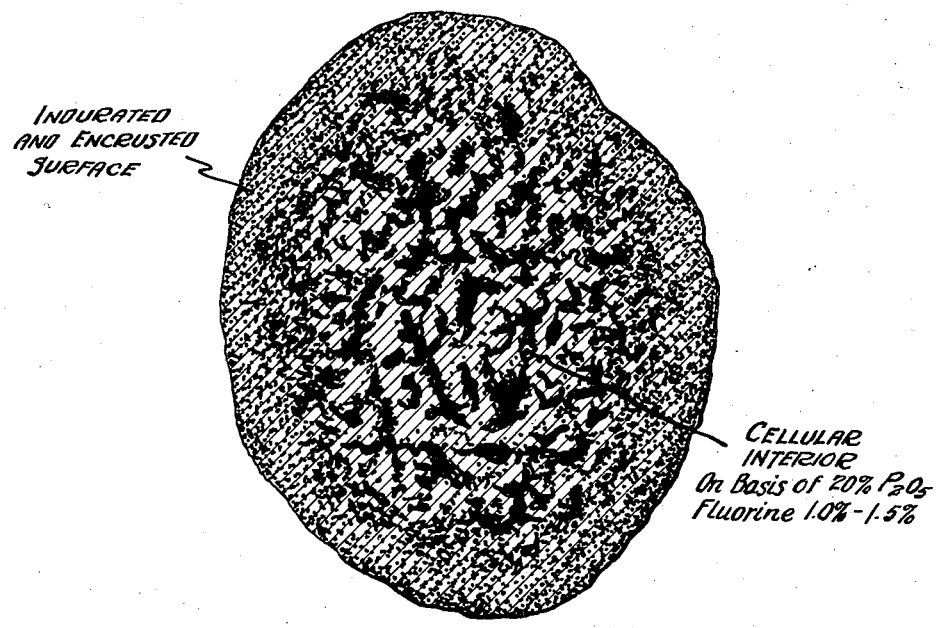

2,248,515

UNITED STATES PATENT OFFICE 2,248,515

METHOD OF PRODUCING GRANULAR SUPERPHOSPHATE OF LOW FLUORINE CONTENT

Mark Shoeld, Baltimore, Md., assignor to The Davison Chemical Corporation, Baltimore, Md.

Application June 15, 1938, Serial No. 213,930

3 Claims. (Cl. 71—44)

My invention relates to an improved type of granular superphosphate, and to a method of making the same.

Ordinary den superphosphate and granular superphosphate made in a closed container have a relatively high percent of fluorine in the final product. This fluorine is of great disadvantage in the industry, since it causes bag rot, and is otherwise undesirable. Bag rot causes the bags in which the superphosphate is shipped to rot and there is loss and waste in shipment. Bag rot results in a considerable economic loss in the market of superphosphate.

An object of my invention is to provide a granular superphosphate which is low in fluorine content, and an economic process for the manufacture of such granular superphosphate.

In addition to inhibiting bag rot, it has been found that the low fluorine content has a decided beneficial effect upon the setting qualities of the product either by itself, or in admixture with other materials.

In general, my process consists in forming a granular superphosphate from den superphosphate. Preferably I employ fresh den superphosphate, but cured, or partially cured, den superphosphate may be employed. The starting material is conditioned by subjecting it to agglomeration in the presence of moisture and the agglomerated particles are then dried while agitating them, such as in a rotary direct heat dryer. This process results in hard, dry, indurated and encrusted granules, which are several times the crushing strength of ordinary den superphosphate. It has been found that the drying step should be carried to a point that the superphosphate contains approximately 3 to 8 percent moisture. While the drying step is in progress the hot gases are caused to flow over the granules while tumbling in the rotary dryer. The process is so regulated that when the desired moisture content is obtained the fluorine in the final product has been greatly reduced. The heat and the volume of hot gases are so regulated that over 30 percent of the original fluorine content of the rock is eliminated, while the moisture is reduced to between the limits of 3 to 8 percent. The granular superphosphate is then stored and allowed to cure to obtain a material of high available $P_2O_5$ with low fluorine content.

In the drawings:

Figure 1 is a flow sheet illustrating diagrammatically my process;

Figure 2 is a nodule of the granular superphosphate; and

Figure 3 is a cross sectional view of the nodule shown in Figure 2.

Referring to the drawings, I have shown that I may employ a fresh, cured, or partially cured den superphosphate. Ordinarily it is more economical to employ a fresh den superphosphate for the process. A cured, or partially cured superphosphate, however, may be granulated if desired. The starting material has mixed with it a finely divided dry material in the conditioning step. This dry material may be for instance sand or fully cured den superphosphate, or ground phosphate rock, or classifier dust. Classifier dust is obtained by removing the dust from the step of classification of the nodule sizes. The larger lumps may be broken and subjected to classification by means of screening or otherwise to get the final product of the desired fineness, which is kept substantially uniform in order to insure its free flowing qualities when applied to the land. The fine dust which is collected from this classifying process can be returned to the process mixed with, for instance, the fresh den superphosphate.

Water is added to the mixture of the starting material, such as fresh den super, and the dry finely divided material, such as the classifier dust. This conditioning stage is one in which agglomerated particles are formed, which are subsequently dried in the drying step. Ordinarily, the conditioning step is carried out in a rotary drum. In actual practice the contents of the drum may be inspected by an operator who regulates the amount of water which is introduced at this stage through sprays directed inside the drum. By means of a beam of light thrown on the material in the drum, the operator can estimate accurately the amount of water which should be added to produce agglomerated particles of substantially the desired uniform size.

From the agglomeration step the material is then passed to the drying step where, under agitation, the moisture in the agglomerated material is reduced and the fluorine content is reduced to a desired minimum.

Ordinarily the amount of water which the agglomerated particles should lose in their passage through the direct heat dryer is such as to reduce the final moisture content to 3 to 8 percent. Best results are obtained when the moisture content is reduced to 4 to 6 percent. Ordinarily the maximum results will obtain when 5 percent moisture is obtained in the final product from the dryer. The aim, therefore, is in general to maintain the moisture between the limits of 4½ to 5½ percent in the product from the dryer.

When such moisture limits are maintained as above specified, danger of reversion of the available $P_2O_5$ is eliminated in the storage of the granular material. In fact, if proper moisture limits are maintained, there is an actual accelerated curing of the granules under storage so that within a relatively short time there is obtained a high percent of available $P_2O_5$. Some curing of course occurs in the passage of the granules through the dryer.

The regulation of the moisture in the dryer is, therefore, an important factor since it controls the curing rate in the dryer and the curing rate in storage after the dryer. Together with this moisture elimination, it is very necessary to maintain a temperature of the drying gases and a volume control of the drying gases such that by the time the granules have arrived at the desired minimum moisture content, they shall be ready to leave the drying step. This regulation of temperature of the gases and their volumetric motion over the drying particles should be such as to insure that over 35 percent of the original fluorine content is eliminated at the end of the drying cycle. This may be stated in another way by stating that on the basis of 20 percent of total $P_2O_5$ the fluorine content should be reduced to approximately 1.1 percent to 1.45 percent, when the final desired moisture content has been reached at the end of the drying step.

The operation of the fluorine basis of computation will now be explained.

The fluorine content of the superphosphate of course comes from the phosphate rock. By far the most important phosphate rock used for superphosphate manufacture in the United States is Florida rock. The fluorine content of this rock does not vary very much. A typical example is the following analysis: 33.4% $P_2O_5$ and 3.74% F. The superphosphate examples to be given later on are manufactured from this rock.

To be able to better visualize the relative fluorine content of the various materials, it is best to reduce them all to a common basis. For this purpose we will use the fluorine percentage, basis 20% total $P_2O_5$. The composition of the phosphate rock cited above may thus be expressed 2.24% F, basis 20% $P_2O_5$, alternately it may be expressed as $F:P_2O_5$ ratio being 112/1000.

The reason for this procedure is that superphosphates may have varying compositions as to moisture and total $P_2O_5$. The $P_2O_5$ being non-volatile serves as an excellent reference point and the above statement is really an expression of the fluorine content as a function of the total $P_2O_5$ content.

Typical granular superphosphate made in a closed container from the Florida rock, as disclosed in Reissue Patent No. 19,825, has the following composition: 19.9% total $P_2O_5$ and 1.88% F. On the basis of 20% total $P_2O_5$, the fluorine content is 1.90%, the $F:P_2O_5$ ratio being 85/1000.

The fraction of the fluorine eliminated during the closed container method of manufacture is therefore:

$$\frac{2.24-1.90}{2.24}$$

This means that 15.2% of the fluorine originally present in the rock has been eliminated.

Granular superphosphate made by the present process from the Florida rock analyzes as follows: 21.45% total $P_2O_5$ and 1.40% F. On the basis of 20% total $P_2O_5$, the fluorine content is 1.30%, the $F:P_2O_5$ ratio being 65/1000.

The fraction of the fluorine eliminated during the granular super manufacture is therefore:

$$\frac{2.24-1.30}{2.24}$$

This means that 42% of the fluorine originally present in the rock has been eliminated.

Tabulating the above, the result is as follows:

|  | Granular superphosphate made by closed container method on leaving container | Granular superphosphate made by this process on leaving the dryer |
|---|---|---|
| Percentage of original fluorine eliminated during manufacture of granular super | 15.2 | 42.0 |
| Percent fluorine in the granular super, basis 20% total $P_2O_5$ | 1.90 | 1.30 |
| $F:P_2O_5$ ratio | 85/1000 | 65/1000 |

The effect of the above startling difference between the two kinds of granular superphosphate is fully borne out by actual practical experience as to bag rot and set.

In classifying the nodules, there are some nodules over size, and these are crushed and the crushed material classified. As previously explained, the dust from the classifying step can be returned to the conditioning step where the agglomeration of the particles occurs.

I desire that the invention be limited only by the scope of the appended claims and the showing of the prior art.

I claim:

1. A method of treating den superphosphate to produce a granular superphosphate fertilizer having a low fluorine content and accelerated curing rate which is in hard dry indurated and encrusted particles which have several times the crushing strength of ordinary den superphosphate comprising subjecting the den superphosphate to a conditioning step in the presence of moisture, tumbling the material to produce agglomerated particles, subjecting the particles to a drying step in which the particles are agitated and subjected to hot gases, discharging the particles from the drying step when the moisture content has been reduced to from 4½% to 5½% of water, and regulating the temperature of the gases and their flow over the agglomerated particles so that by the time the final moisture content has been attained the fluorine content of the particles lies between 1.1% and 1.45% on a basis of 20% total $P_2O_5$.

2. A method of treating den superphosphate to produce a granular superphosphate fertilizer having a low fluorine content and accelerated curing rate which is in hard dry indurated and encrusted particles which have several times the crushing strength of ordinary den superphosphate comprising mixing den superphosphate with finely divided material, adding an aqueous medium to the mixture under agitation to produce agglomerated particles, subjecting the particles to a drying step in which the particles are agitated and subjected to hot gases, discharging the particles from the drying step when the moisture content has been reduced from 4½% to 5½% of water, and regulating the temperature of the gases and their flow over the agglomerated particles so that by the time the final moisture content has been attained the fluorine content of the particles lies between 1.1% and 1.45% on a basis of 20% total $P_2O_5$.

3. A method of treating den superphosphate to produce a granular superphosphate fertilizer having a low fluorine content and accelerated curing rate which is in hard dry indurated and encrusted particles which have several times the crushing strength of ordinary den superphosphate comprising mixing den superphosphate with finely divided material, adding an aqueous medium to the mixture under agitation to produce agglomerated particles, subjecting the particles to direct heat under agitation and regulating the temperature of the heating gases and their flow so that the fluorine content lies between 1.1% and 1.45% on a basis of 20% total $P_2O_5$ while the final moisture content is reduced to between 4½% and 5½%.

MARK SHOELD.